Aug. 1, 1950     F. E. FROST     2,517,476
CAP SCREW
Filed July 9, 1945
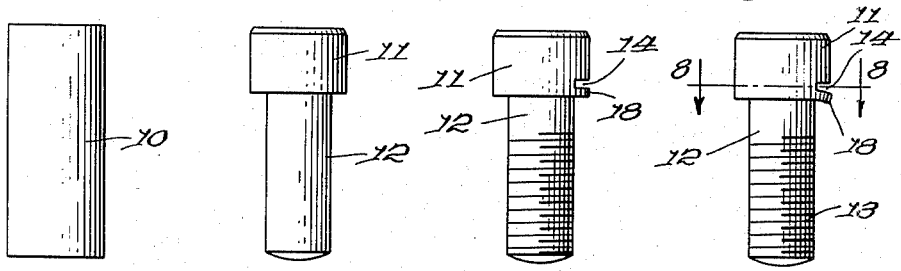
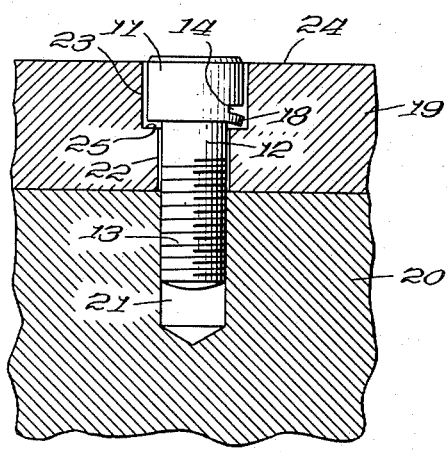
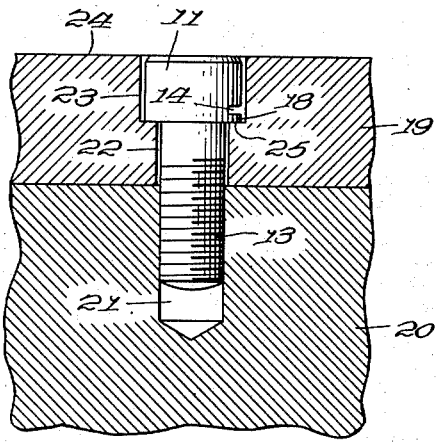
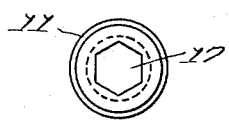
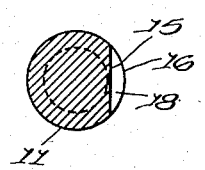
Inventor:
Frank E. Frost.
By Kenneth T. Snow
Atty.

Patented Aug. 1, 1950

2,517,476

UNITED STATES PATENT OFFICE 2,517,476

CAP SCREW

Frank E. Frost, Chicago, Ill., assignor of one-half to Kenneth T. Snow, Oak Park, Ill.

Application July 9, 1945, Serial No. 603,874

1 Claim. (Cl. 151—32)

This invention relates to a new and improved cap screw and has for one of its principal objects the provision of means for causing the cap screw to automatically lock when it is screwed up tightly.

Heretofore nuts have been made with integral locking means for the purpose of eliminating separate lock washers. These integral locking means have taken many forms, but each one of them in some way relied on the binding of the nut threads to cause locking. Caps of screws, however, do not have threads and hence some new means of locking them in fixed position will be necessary. The need for a cap screw lock has only recently been created. Present day cap screws are generally equipped with socket heads to permit operation of the cap screw when it is in an out of the way position and also when the cap is to be positioned in a recessed hole to receive the cap or head portion.

Applying separate lock washers to recessed cap screws is a difficult job. The centering of the washer alone takes much time and is very tedious labor. Lock washers are often lost during assembly or disassembly, and at other times it is almost impossible to remove them from their dirt and grease embedded position.

It is therefore an important object of this invention to provide a lock integral with a cap screw and which does not rely on thread binding and which may be used over and over again.

Another important object of this invention is the provision of a method of manufacturing a cap screw having incorporated therein an automatic spring lock to maintain the screw in fixed position.

A still further important object of this invention is to provide a simple, economic and automatically operable cap screw lock which does not in any way impair repeated use of the screw and the effectiveness of the lock remains constant despite the number of times the screw is used.

Other and further important objects will become apparent from the disclosures in the following specification and accompanying drawings in which:

Figure 1 is a blank piece of bar stock preferably a malleable iron material.

Figure 2 shows the blank of Figure 1 cut to the general shape of a cap screw.

Figure 3 shows threads cut in the shank and a slot cut in the head of the cap screw as shown in Figure 2.

Figure 4 shows the lower lip portion of the head bent downwardly.

Figure 5 shows the cap screw after heat hardening treatment applied to the job of holding two pieces of material together.

Figure 6 shows the cap screw drawn up tightly in the assembly shown in Figure 5.

Figure 7 is a top plan view of the cap screw of this invention.

Figure 8 is a sectional view taken on the line 8—8 of Figure 4.

As shown in the drawings: The first four figures of the drawing progressively show the steps in the manufacture of the cap screw of this invention. The reference numeral 10 indicates generally a bar of standard steel from which the cap screw of this invention is made. Figure 2 shows the bar 10 cut or formed to include an enlarged head portion 11 and a depending shank portion 12. Figure 3 has had threads 13 cut in the lower portion of the shank 12. A slot 14 preferably parallel to the top and bottom of the head 11 is cut radially inwardly and as shown in Figure 8 is defined by a chord 15 and its included arc 16. The chord 15 is located outside the circumference of the shank portion 12. However the slot may be made at any angle with respect to the top of the head and the desired locking effect could still be secured. The inner edge of the slot need not be a straight chord but might well take the form of an arc. It is preferable that the slot 14 be located in the lower portion of the head 11.

A hexagonal socket 17 as shown in Figure 7 is cut axially of the cap screw in the head 11 for the purpose of turning the screw. It should be understood that the shape of the socket 17 may be varied or may even be dispensed with if the head is provided with some other means to facilitate turning such as a polygonal outer periphery. In the desired form the head 11, as shown, is cylindrical for convenient recessing of the heads when the screws are in use and it is desired to have a continuously smooth surface.

A thin lower lip 18 formed by the slot 14 is bent downwardly as shown in Figure 4. In this condition the entire cap screw is hardened by proper heat treatment to cause the screw to withstand great stresses and strains, and also to cause the lip 18 to possess spring characteristics. The spring lip 18 will hereafter tend to resume its curved down shape and this tendency is utilized in effecting a lock for the cap screw.

In Figure 5 the finished, hardened cap screw is shown as assembling the plate 19 to an inner piece of material 20. The piece of material 20 has an internally threaded bore 21 adapted to receive the threaded shank portion 13 of the cap screw. The plate 19 is equipped with a bore 22 of slightly larger diameter than the shank 12 of the screw but of less diameter than the head 11 of the screw. An enlarged recess 23 is provided in the plate 19 to receive the head 11 so that when the screw is drawn up tightly the upper surface of the head will be flush with the upper surface 24 of the plate 19. The lip 18 is shown as just about to contact the shoulder 25 formed between the recess 23 and the bore 22. Further downward movement of the screw will cause the lip to be pushed upwardly as shown in Figure 6, but inasmuch as the lip is now normally tending toward a downward position it exerts an increased force at its area of contact with the shoulder 25. This increased force acts as a lock against unwarranted rotation of the screw.

Numerous details of construction could be varied without departing from the principles of the cap screw lock disclosed herein, and I therefore do not propose limiting the patent granted hereon otherwise than as necessitated by the appended claim.

I claim:

A cap screw comprising a cylindrical threaded shank, a cylindrical head for said shank of greater diameter than said shank and integral with said shank and concentrically disposed at the upper end thereof, said head having a flat annular underside at right angles to said shank, said head having a socket in the top thereof for engagement by a turning tool, said head having a single transversely disposed slot in the side of the head, said slot defined by a chord located across said head outside the circumference of the shank and the lesser part of the head circumference included in said chord, and said slot disposed in a lower portion of said head defining a relatively thin lower lip and retaining a large thick head, said thin lower lip curved downwardly and possessing spring characteristics whereby when the cap screw is drawn up against a relatively flat surface the thin lower lip springs upwardly against the head causing an automatic spring locking of the cap screw.

FRANK E. FROST.

REFERENCES CITED

The following references are of record in the file of this patent:

UNITED STATES PATENTS

| Number | Name | Date |
| --- | --- | --- |
| 839,235 | Van Boxel | Dec. 24, 1906 |
| 1,049,590 | Mosher | Jan. 7, 1913 |
| 1,406,423 | Smith | Feb. 14, 1922 |
| 1,896,388 | Zeidler | Feb. 7, 1933 |
| 1,956,745 | Payne | May 1, 1934 |
| 2,217,951 | Hosking | Oct. 15, 1940 |
| 2,226,491 | Gustafson | Dec. 24, 1940 |
| 2,229,892 | Hosking | Jan. 28, 1941 |

FOREIGN PATENTS

| Number | Country | Date |
| --- | --- | --- |
| 5,209 | Great Britain | Mar. 12, 1910 |
| 276,786 | Great Britain | Sept. 8, 1927 |